SOLUBILITY OF $Li_2CO_3$ IN $Na_2SO_4$ OR NaCl SOLUTIONS AT 95°C

SOLUBILITY OF $Li_2CO_3$ IN SYSTEM:
$Na_2CO_3 - Li_2CO_3 - NaCl - H_2O$ AT 95° C.

United States Patent Office 3,523,751
Patented Aug. 11, 1970

3,523,751
PRECIPITATION OF LITHIUM CARBONATE FROM LITHIUM CHLORIDE SOLUTION
George M. Burkert, Shelby, and Reuben B. Ellestad, Gastonia, N.C., assignors to Lithium Corporation of America, Bessemer City, N.C., a corporation of Delaware
Filed Oct. 20, 1967, Ser. No. 676,928
Int. Cl. C01d 11/02
U.S. Cl. 23—63                    9 Claims

ABSTRACT OF THE DISCLOSURE

The exploitation of natural chloride brines as a commercial source of lithium requires the preparation of lithium carbonate from lithium chloride, since the former compound is one of the most important commercial lithium products. The reaction of lithium chloride solution with sodium carbonate results in the precipitation of lithium carbonate. The following novel and desirable conditions have been established for this precipitation: (1) simultaneous addition of the LiCl and $Na_2CO_3$ reactants, preferably to a heel from a previous like reaction, to produce a precipitate of $Li_2CO_3$ with good settling, filtering and washing properties; and (2) reactant concentrations which will yield the optimum high concentration of NaCl in the mother liquor, to decrease the solubility of lithium carbonate, and thereby increase the recovery.

BACKGROUND AND SUMMARY OF THE DISCLOSURE

The present invention relates to the chemistry of lithium and, more particularly, to processes for producing lithium carbonate, one of the most important compounds of lithium.

In the past, the major source of lithium has been its silicate ores, notably spondumene ($LiAlSi_2O_6$), petalite ($LiAlSi_4O_{10}$) and lepidolite (a complex lithium mica). Although many processes have been proposed for the extraction of lithium from such ores, only two general processes commonly have been practiced. The first such process has involved a sulfuric acid reaction, which initially forms a crude lithium sulfate solution. The second such process has involved some variant of a lime or limestone roast, which initially forms an impure lithium hydroxide solution. Lithium carbonate is prepared from a solution of the above type that has been purified suitably. Lithium hydroxide solutions are readily carbonated (with $CO_2$) to precipitate $Li_2CO_3$. Lithium sulfate solutions (containing essentially only $Li_2SO_4$, $Na_2SO_4$ and $K_2SO_4$) are reacted with soda ash ($Na_2CO_3$) to precipitate $Li_2CO_3$.

The utilization of lithium-bearing, natural chloride brines as a commercial source of lithium presents a different situation, since the production of $Li_2CO_3$ will normally involve the precipitation of $Li_2CO_3$ from a chloride solution. The present invention deals with the conditions necessary, when operating with chloride solution, to obtain a $Li_2CO_3$ precipitate with desirable physical and chemical properties, and with a high recovery.

Primary objects of the present invention are: precipitating lithium carbonate from lithium chloride solution by simultaneously adding LiCl solution and $Na_2CO_3$ solution (or slurry) to a reaction vessel, and preferably to a heel from a previous like reaction, to produce a precipitate with good settling, filtering and washing properties; reacting LiCl and $Na_2CO_3$ in solution under conditions such that dissolved NaCl is maximized but not precipitated in order to optimize lithium carbonate recovery without NaCl contamination; provision of a process of the foregoing type in which, by weight, LiCl concentration in the LiCl composition ranges from 15 to 45% and $Na_2CO_3$ concentration in the $Na_2CO_3$ composition ranges from 25 to 56%, the higher ranges of the latter being slurries of $Na_2CO_3 \cdot H_2O$; provision of a process of the foregoing type in which the reactants are mixed at temperatures ranging from room temperature to approximately 100° C. and the lithium carbonate precipitate is separated by centrifugation at a temperature near 100° C., viz. within the approximate range of 90 to 100° C.; and provision of a process of the foregoing type with high filtering temperature, high NaCl concentration and excess $Na_2CO_3$ to achieve high $Li_2CO_3$ recovery.

Other objects of the present invention will in part be obvious and will in part appear hereinafter.

The invention accordingly comprises the process characterized by the steps, conditions, concentrations and relationships that are exemplified by the following detailed disclosure, the scope of which will be indicated in the appended claims.

BRIEF DESCRIPTION OF THE DRAWINGS

For a fuller understanding of the present invention, reference should be had to the accompanying drawings, wherein.

DETAILED DESCRIPTION

Precipitation of $Li_2CO_3$ from $Li_2SO_4$ solution

The following discussion of the procedure normally used for the precipitation of $Li_2CO_3$ from sulfate solution is intended to illustrate generally certain conditions and results of prior processes for reference comparison with the process of the present invention, which is described in detail below.

In the precipitation of $Li_2CO_3$, by reaction in solution between $Li_2SO_4$ and soda ash, there is no difficulty in obtaining a dense precipitate, with good settling, filtering and washing properties in order to form a wet cake of low moisture content. The chemical reaction, in aqueous solution is as follows:

$$Li_2SO_4 + Na_2CO_3 \rightarrow Li_2CO_3 + Na_2SO_4$$

The following observations and considerations are pertinent:

(1) Concentration of reactants.—Since $Li_2CO_3$ has an appreciable solubility, especially in the mother liquor of this reaction, it is desirable to operate with rather concentrated solutions in order to minimize the volume of mother liquor. The $Li_2SO_4$ concentration usually ranges from 200 to 250 grams/liter, depending upon the amount of $Na_2SO_4$ and $K_2SO_4$ present. The soda ash solution usually ranges from 26 to 30 weight percent (2.8 to 3 pounds of $Na_2CO_3$/gallon).

(2) Temperature.—The solubility of $Li_2CO_3$ in water or in salt solutions decreases with increase in temperature. Therefore, to minimize solubility loss, it is advantageous to carry out the precipitation, and especially the centrifuging, at elevated temperature, usually near 100° C.

(3) Use of excess $Na_2CO_3$.—The use of approximately 10 to 15% excess $Na_2CO_3$ over that equivalent to the $Li_2SO_4$ is desirable, since the increased carbonate ion concentration lowers the solubility of $Li_2CO_3$ in the mother liquor.

Figure 1:
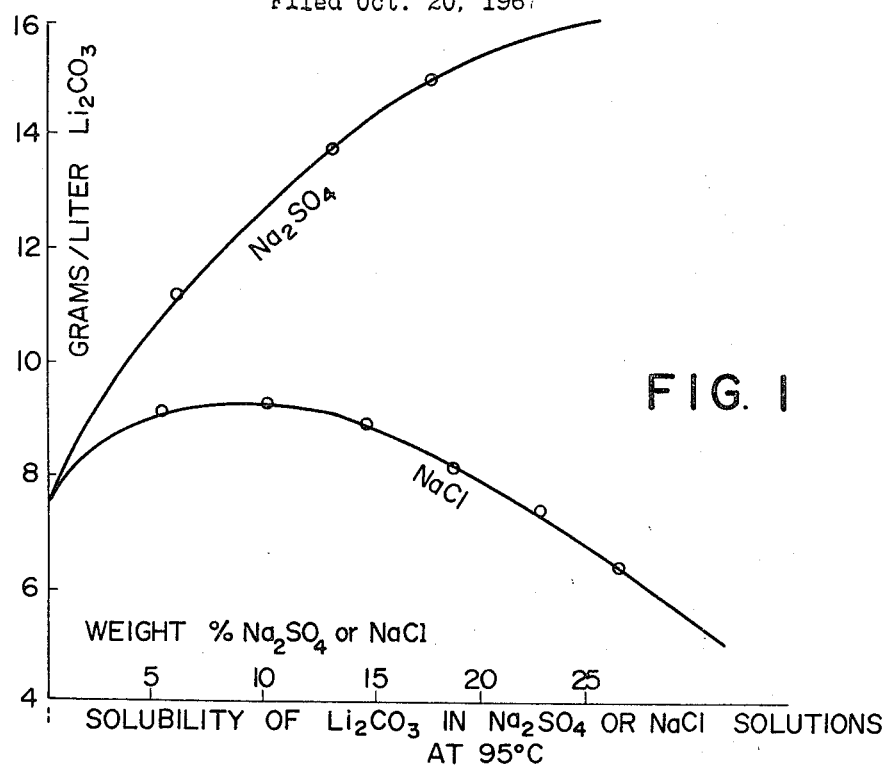
FIG. 1 is a graph in which solubility of $Li_2CO_3$ at 95° C. is plotted against concentration of $Na_2SO_4$ or NaCl in aqueous solution.

(4) Effect of $Na_2SO_4$ on the solubility of $Li_2CO_3$.— As indicated in the foregoing equation $Na_2SO_4$ equivalent to the precipitated $Li_2CO_3$ is present in the mother liquor. This has an adverse effect on the solubility of $Li_2CO_3$, as shown by the upper curve of FIG. 1, which presents data for 95% C. Note that in pure water the solubility of $Li_2CO_3$ is 7.5 grams/liter, whereas in 20 wt. percent $Na_2SO_4$, the solubility increases to 15.4 grams/liter. Normally the $Na_2SO_4$ content of the mother liquor is approximately 15 to 20 weight percent. Without the use of excess $Na_2CO_3$, there is a $Li_2CO_3$ loss in the mother liquor of about 15 grams/liter. The use of excess $Na_2CO_3$ reduces this loss to 12 to 13 grams/liter. Calculation shows that, under these conditions, approximately 15% of the lithium present in the starting $Li_2SO_4$ solution remains unprecipitated in the mother liquor as soluble $Li_2CO_3$. This soluble lithium may be recovered almost completely by precipitation as the fluoride, the phosphate or the silicate. However, none of these recovery procedures is economic for various reasons. The most practical procedure is to cool the mother liquor to near 0° C., thereby crystallizing the major part of the $Na_2SO_4$ as

which is removed by centrifuging. This hydrate is converted to anhydrous $Na_2SO_4$, which is a saleable byproduct. The mother liquor from this crystallization carries the unrecovered lithium in solution, along with a small amount of $Na_2SO_4$. This liquor then is recycled into the ore leach circuit.

Precipitation of $Li_2CO_3$ from LiCl solution in accordance with the present invention The exploitation of natural chloride brines (e.g., Great Salt Lake) as a source of lithium normally results in an impure, concentrated lithium chloride solution. Purification yields a solution containing essentially only the alkali chlorides, with minor amounts of sulfate. Reaction with sodium carbonate precipitates lithium carbonate according to the equation:

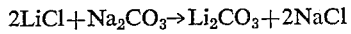

It is to be noted that NaCl equivalent to the $Li_2CO_3$ is formed by this reaction. As in the lithium sulfate process described above, here there is also an appreciable solubility of $Li_2CO_3$. However, here the presence of a large amount of NaCl renders the recovery of unprecipitated $Li_2CO_3$ difficult, unlike in the lithium sulfate process described above, since cooling to 0° C. removes only a minor amount of the NaCl. Recycling of the mother liquor to some early stage of the brine operation is a possibility. In any case, however, it is desirable to achieve the highest economic recovery possible in the initial precipitation, whether the mother liquor is discarded or recycled.

Experimental precipitations of $Li_2CO_3$ from LiCl show that generally it is much more difficult to obtain $Li_2CO_3$ with good settling, filtering and washing characteristics when working with LiCl solutions than when working with $Li_2SO_4$ solutions. The following observations and conclusions are pertinent to the precipitation of $Li_2CO_3$ from LiCl solutions.

(1) Effect of NaCl on the solubility of $Li_2CO_3$.—As mentioned above in the discussion of $Li_2CO_3$ precipitation from sulfate solution, $Na_2SO_4$ formed in the mother liquor increases the $Li_2CO_3$ solubility. The effect of NaCl on $Li_2CO_3$ solubility is quite different. A study of the effect of NaCl concentration on $Li_2CO_3$ solubility has resulted in the lower curve shown in FIG. 1. At 95° C., as NaCl concentration increases to about 9%, the solubility of $Li_2CO_3$ increases from 7.5 grams/liter in pure water to about 9.3 grams/liter. As NaCl concentration increases further, $Li_2CO_3$ solubility decreases so that, at 25 weight percent NaCl, it is only about 6.5 grams/liter, less than the solubility in water. It may be noted here that KCl has a similar effect on $Li_2CO_3$ solubility, of approximately the same magnitude.

(2a) Concentration of reactants.—In view of the above data on the effect of NaCl concentration on $Li_2CO_3$ solubility, it is desirable to operate with reactant concentrations that yield high NaCl concentration in the mother liquor. Precipitation of NaCl by exceeding its maximum solubility must be avoided. When operating with aqueous solutions of LiCl and $Na_2CO_3$, NaCl precipitation is not possible. However, when $Na_2CO_3$ in the form of a slurry of solid $Na_2CO_3 \cdot H_2O$ in its saturated solution is used, care must be taken to ensure that the reactant concentrations do not result in precipitation of NaCl. Also in such cases, due allowance must be made for the effect of excess $Na_2CO_3$ which moderately decreases solubility of NaCl in the mother liquor, as well as for the presence of NaCl in the LiCl soltuion (see 2b below).

(2b) Lithium chloride solutions.—In the recovery of lithium from natural chloride brines, the recovered LiCl solution, after suitable purification, usually contains a moderate amount of NaCl and KCl. By simple concentration, both of the latter (particularly the NaCl) may be reduced to rather low levels. The following table shows the solubility of NaCl in solutions of varying LiCl content, at 25° C. and 100° C.

TABLE I

| Weight percent LiCl | Weight percent NaCl at 25° C. | Weight percent NaCl at 100° C. |
|---|---|---|
| 12 | 12.3 | 15.0 |
| 18 | 6.5 | 9.3 |
| 20 | 5.3 | 8.0 |
| 25 | 2.6 | 5.0 |
| 30 | 1.0 | 2.6 |
| 40 | 0.2 | 1.1 |
| 45 | 0.2 | 0.8 |

Under the proper conditions, $Li_2CO_3$ precipitates with good physical properties can be obtained from the whole range of LiCl concentrations listed above. However, the recoveries of course will vary widely, increasing as the LiCl concentration is increased.

(2c) Sodium carbonate solution.—It has been found that, in addition to effecting $Li_2CO_3$ precipitations with concentrated $Na_2CO_3$ solutions (26 to 33 weight percent $Na_2CO_3$), it also is possible to use slurries of soda ash and water, with a total $Na_2CO_3$ content above 33 weight percent. Such slurries consist of a mixture of solid $Na_2CO_3 \cdot H_2O$ in a saturated $Na_2CO_3$ solution. Slurries containing as much as 56 weight percent total $Na_2CO_3$, which may be pumped without difficulty, have been used successfully. Use of these slurries enables the achievement of the highest practical NaCl concentration in the mother liquor, in conjunction with a LiCl solution of appropriate concentration. Consequent recovery of $Li_2CO_3$ is high. One disadvantage of using slurries is the inability to remove certain insoluble impurities in the soda ash by filtration.

(3) Order of mixing reactants.—In precipitating $Li_2CO_3$ from $Li_2SO_4$ solution, good settling, filtering, and washing characteristics are obtained readily, either by adding concentrated $Na_2CO_3$ solution to the concentrated $Li_2SO_4$ solution, or vice versa. However, with LiCl solutions it was found that precipitates with comparable desirable physical characteristics could not be obtained by either procedure. Good precipitates were obtained with somewhat dilute LiCl solutions when the latter were added cold (25° C.) to the cold $Na_2CO_3$ solution, followed by heating to about 95° C. before centrifugation. This technique succeeded only when a LiCl solution of not more than 20 weight percent LiCl was used, whereas it is desirable to operate with stronger solutions in order to obtain a higher recovery. In accordance with the present invention it has now been found that the best procedure for mixing the reactants is the simultaneous addition of the LiCl solution and the $Na_2CO_3$ solution (or slurry) to a moderately sized heel of the unfiltered slurry (or of mother liquor) from a previous precipitation. Typically each solution is added at a flow rate which is approximately proportional to its volume and so that the total time for the addition is approximately 1 hour. Good agitation is maintained throughout. This technique has resulted in precipitates with excellent physical properties, similar to those obtained with $Li_2SO_4$ solutions, and is applicable to LiCl solutions as concentrated as 45 weight percent LiCl.

(4) Temperature of precipitation.—It has been stated previously that the solubility of $Li_2CO_3$, either in water or in $Na_2SO_4$ or NaCl solution, is retrograde, i.e., increase in the temperature results in a lower solubility, contrary to the usual effect of temperature on solubility. Therefore it is necessary to centrifuge or filter at elevated temperature in order to improve recovery. It has been found that in using the simultaneous technique described above, the reactants may be mixed at room temperature or at some intermediate temperature, such as 50° C., instead of at 95° C. Thereafter the temperature is increased up to about 95° C. before centrifuging to yield a precipitate with excellent properties. This is an advantage over the use of an addition temperature near 95° C. since it eliminates the undesirable evaporation and heat loss which would be experienced by maintaining a temperature near 95° C. during the relatively long addition step.

Figure 2:
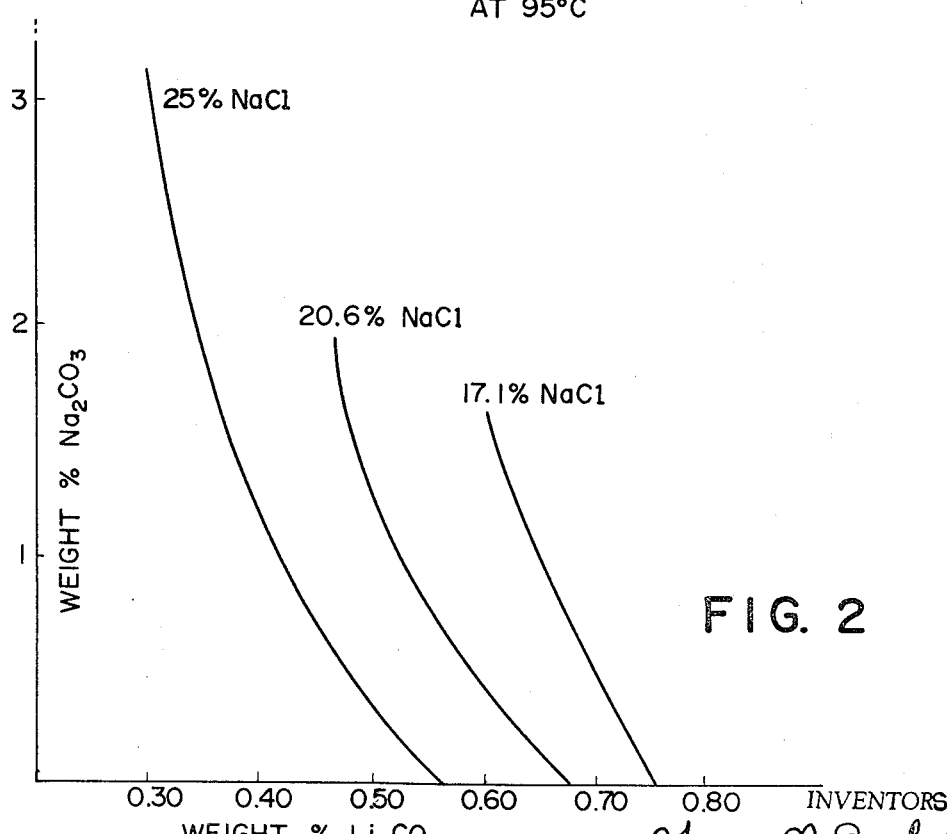
FIG. 2 is a graph in which solubility of $Li_2CO_3$ is indicated as a function of $Na_2CO_3$ concentration, for three different concentrations of NaCl.

(5) Use of excess $Na_2CO_3$.—As stated in the discussion of the precipitation of $Li_2CO_3$ from $Li_2SO_4$ solution, it is desirable to use approximately 10% excess $Na_2CO_3$ above that equivalent to $Li_2SO_4$, thereby decreasing the $Li_2CO_3$ solubility in the mother liquor by virtue of the increased carbonate ion concentration. An analogous excess is desirable in the present case of $Li_2CO_3$ precipitation from LiCl solution. The decrease in $Li_2CO_3$ solubility with increase in $Na_2CO_3$ concentration is not linear, the rate of decrease falling off with $Na_2CO_3$ increase. Therefore, the cost of the excess $Na_2CO_3$ used must be balanced against the increase in $Li_2CO_3$ recovery to ensure that the excess is justified. Usually an excess of 5 to 10% $Na_2CO_3$ over the stoichiometric amount is advantageous. The three curves of FIG. 2 give the experimentally determined values of $Li_2CO_3$ solubility at 95° C., as a function of $Na_2CO_3$ concentration, for three levels of NaCl concentraiton. These curves illustrate graphically the effect of both $Na_2CO_3$ and NaCl concentration on the solubility of $Li_2CO_3$. These curves may be used to calculate the expected loss of $Li_2CO_3$ in the mother liquor for any given set of reactant compositions and concentrations.

SPECIFIC EXAMPLES

The following non-limiting examples further illustrate the present invention:

Example 1 (all parts by weight)

A solution containing 70 parts of LiCl, 7 parts of NaCl and 203 parts of $H_2O$ (25% LiCl—2.5% NaCl) and a $Na_2CO_3$ solution containing 89.3 parts of $Na_2CO_3$ and 229.3 parts of $H_2O$ (28% $Na_2CO_3$) were added simultaneously to 110 parts of mother liquor from a previous precipitation. The latter was at 95° C. and was held close to this temperature during the reaction. The flow rates of the reactants were adjusted so that each solution required about 1 hour for its addition. Good agitation was maintained during the reaction. The amount of $Na_2CO_3$ added corresponded to a 2% excess over the stoichiometric requirement. After the reaction, the settling rate was measured. The solids settled to 55% of the original volume in 1 minute, and to 50% in 3 minutes. The hot slurry was centrifuged in a basket centrifuge, and washed with 60 parts of hot water. The moisture content of the wet cake was 12.5% (in the range of the moisture content normally found in $Li_2CO_3$ precipitated from $Li_2SO_4$ solution). The wet cake was dried at 110° C. Analysis of the dried product showed 0.08% chloride present. In this example, the mother liquor contained 19.3% NaCl. In the resulting precipitate, 94.2% of the original LiCl was recovered as $Li_2CO_3$.

Example 2 (all parts by weight)

A LiCl solution containing 70 parts of LiCl and 105 parts of $H_2O$ (40% LiCl) and a $Na_2CO_3$ solution containing 96.3 parts of $Na_2CO_3$ and 247.6 parts of $H_2O$ (28% $Na_2CO_3$) were added simultaneously to 110 parts of mother liquor from a previous precipitation. The latter was at 90–95° C. and was held at this temperature during the reaction. The flow rates of the reactants were such that each solution required about 1 hour for its addition, with good agitation being maintained during the reaction. The excess $Na_2CO_3$ used was 10% over the stoichiometric requirement. After the reaction, settling was measured. The solids settled to 65% of the original volume in 1 minute, and to 60% of the original volume in 3 minutes. The hot slurry was centrifuged on a basket centrifuge, and washed with 60 parts of hot water. The moisture content of the wet cake was 18.3%. The chloride content of the cake dried at 110° C. was 0.19%. The NaCl content of the mother liquor was 21.1%. The recovery of $Li_2CO_3$ was 96.6%.

Example 3 (all parts by weight)

A solution containing 50 parts of LiCl, 3.7 parts of NaCl and 138 parts of $H_2O$ (26% LiCl—1.9% NaCl) and a $Na_2CO_3$ slurry containing 65.6 parts of $Na_2CO_3$ and 74 parts of water (47% $Na_2CO_3$) were pumped simultaneously into 128 parts of mother liquor from a similar previous precipitation, with continuous agitation. The flow rates of the reactants were adjusted so that each solution required about 1 hour for its addition. All solutions were held at 95° C. The amount of $Na_2CO_3$ used corresponds to a 5% excess over the stoichiometric requirement. After the reactants had been added, the slurry was held at 95° C., with continued agitation, for one hour. The settling rate was then measured, and found to be 7 feet/hour. The hot slurry was centrifuged in a basket centrifuge. The following centrifuge data were obtained:

TABLE II

| Wash rate, lbs. $H_2O$/lb. dry cake | Force, G's | Drain rate, lbs./hr./ft.$^2$ | Percent moisture after each wash |
|---|---|---|---|
| 1.7 | 600 | 39.5 | 28.1 |
| 1.43 | 800 | 35.5 | 24.2 |
| 1.33 | 1,000 | 26.3 | 21.1 |

A portion of the washed, wet cake was dried at 110° C. The dry sample contained 0.07% Na and 0.11% Cl. In this example, the mother liquor contained 25% NaCl and 1.07% $Na_2CO_3$; 97.3% of the LiCl taken was recovered as $Li_2CO_3$.

What is claimed is:

1. A process for producing lithium carbonate, said process comprising the simultaneous steps of adding an aqueous lithium chloride composition and an aqueous sodium carbonate composition to a reaction vessel, said lithium chloride composition containing from 15 to 45 weight percent lithium chloride and said sodium carbonate composition containing from 25 to 56 weight percent sodium carbonate, and precipitating said lithium carbonate in a form having good settling; filtering and washing properties, said simultaneous steps being conducted at a temperature ranging from room temperature to approximately 100° C.

2. The process of claim 1 wherein said lithium chloride composition is a solution and said sodium carbonate composition is a solution.

3. The process of claim 1 wherein said lithium chloride composition is a solution and said sodium carbonate composition is a slurry.

4. A process for producing lithium carbonate, said process comprising: first, the simultaneous steps of adding an aqueous lithium chloride composition and an aqueous sodium carbonate composition to a reaction vessel, said lithium chloride composition containing from 15 to 45 weight percent lithium chloride and said sodium carbonate composition containing from 25 to 56 weight percent sodium carbonate, and precipitating said lithium carbonate in a form having good settling, filtering and washing properties, said simultaneous steps being conducted at a temperature ranging from room temperature to approximately 100° C.; and second, the steps of centrifuging the resulting composition at a temperature in the approximate range of 90 to 100° C.

5. The process of claim 4 wherein said lithium chloride composition is a solution and said sodium carbonate composition is a solution.

6. The process of claim 4 wherein said lithium chloride composition is a solution and said sodium carbonate composition is a slurry.

7. The process of claim 4 wherein said sodium carbonate is in excess stoichiometrically in consequence of said simultaneous steps in order to lower lithium carbonate solubility.

8. The process of claim 4 wherein said reaction vessel initially contains a heel from a previous reaction of a lithium chloride composition and a sodium carbonate composition, said heel being unfiltered slurry.

9. The process of claim 4 wherein said reaction vessel initially contains a heel from a previous reaction of lithium chloride composition and a sodium carbonate composition, said heel being mother liquor.

References Cited
UNITED STATES PATENTS

| | | | |
|---|---|---|---|
| 2,793,934 | 5/1957 | Cunningham | 23—33 |
| 3,007,771 | 11/1961 | Mazza et al. | 23—63 |
| 3,099,527 | 7/1963 | Howling | 23—31 X |

OSCAR R. VERTIZ, Primary Examiner

G. T. OZAKI, Assistant Examiner